Figure 3:
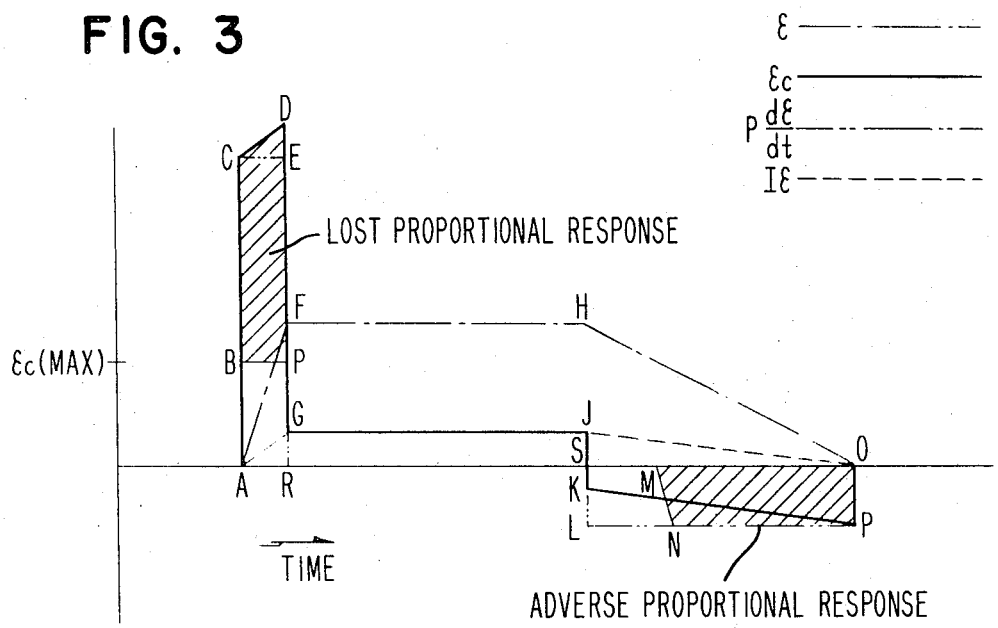

United States Patent

[11] 3,566,241

| [72] | Inventor | Charles W. Ross |
| | | Hatboro, Pa. |
| [21] | Appl. No. | 586,257 |
| [22] | Filed | Oct. 12, 1966 |
| [45] | Patented | Feb. 23, 1971 |
| [73] | Assignee | Leeds & Northrup Company |
| | | Philadelphia, Pa. |

[54] PROCESS SERVO CONTROL SYSTEM INCLUDING ERROR SIGNAL LIMITATION TO PREVENT DEGRADED RESPONSE
4 Claims, 7 Drawing Figs.

[52] U.S. Cl. ........................................... 318/624,
318/610, 318/635, 318/599
[51] Int. Cl. ............................................... G05b 5/01
[50] Field of Search ........................................... 318/59,
609, 610, 624, 635

[56] References Cited
UNITED STATES PATENTS

| 2,666,171 | 1/1954 | Williams, Jr. et al. | 318/(20.395) |
| 3,219,936 | 11/1965 | Eksten et al. | 318/(20.395X) |
| 3,201,675 | 8/1965 | Curran et al. | 318/(20.441X) |
| 3,373,675 | 3/1968 | Best | 318/(20.441X) |
| 3,079,539 | 2/1963 | Guerth | 318/(20.480)UX |
| 3,219,936 | 11/1965 | Eksten et al. | 318/(20,390)UX |
| 3,260,912 | 7/1966 | Gregory | 318/(20.480)UX |
| 3,373,268 | 3/1968 | Hewlett, Jr. | 318/(20.390)UX |
| 3,377,547 | 4/1968 | Ohlson | 318/(20.395)UX |

Primary Examiner—T.E. Lynch
Attorneys—William G. Miller, Jr. and Raymond F. MacKay ABSTRACT: In a PI process controller subject to degraded response such as reset windup caused by the limited ability of some component to follow changing error signals, means are provided to prevent this degradation. This means includes an additional loop around the controller which includes threshold devices to render the loop inoperative except when the controller output exceeds the threshold magnitude. When this occurs, the additional loop acts to prevent the degraded response.

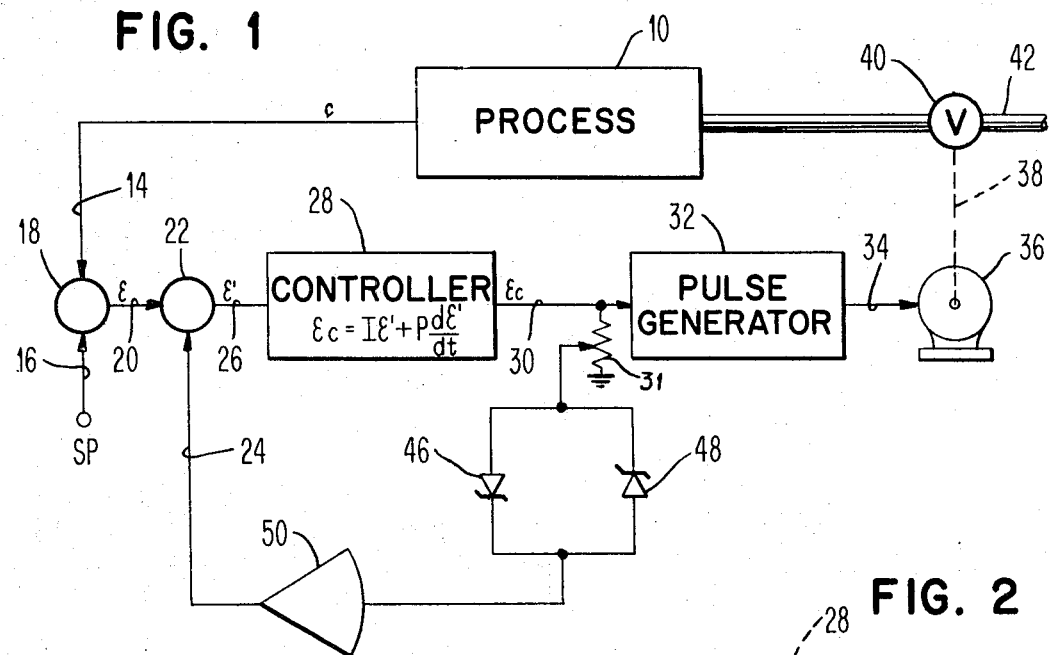
FIG. 1
FIG. 2
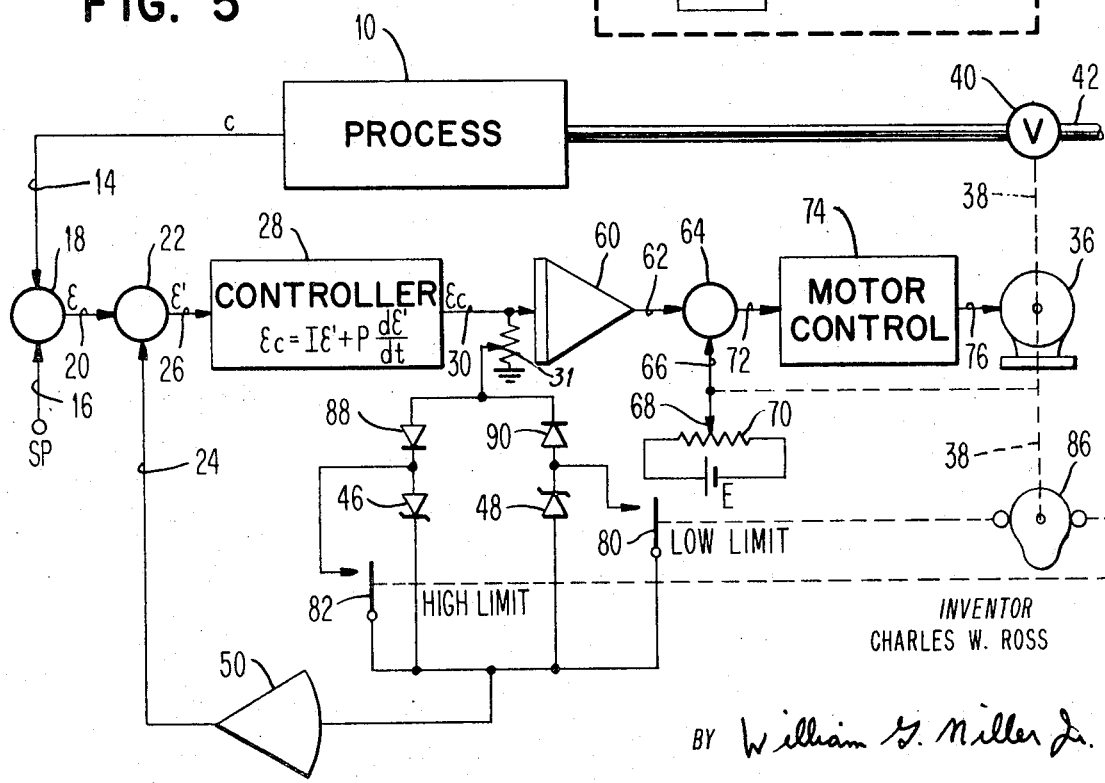
FIG. 5
INVENTOR
CHARLES W. ROSS
BY William G. Miller Jr.
AGENT

3,566,241

PROCESS SERVO CONTROL SYSTEM INCLUDING ERROR SIGNAL LIMITATION TO PREVENT DEGRADED RESPONSE

PROCESS CONTROL SYSTEM FOR AVOIDING DEGRADED RESPONSE

This invention relates to process control systems and more particularly to a method and means for preventing a degradation of the response obtained from control apparatus due to a limitation in the response of a component of the control apparatus.

Process controllers of the two-mode type which generate both proportional and reset functions as well as process controllers of the three-mode type which generate an additional rate function are subject not only to the long recognized problem of reset windup, which is frequently due to incorrect storage of information in the control circuit, but they are also subject to having the response of the controller degraded by an inability of the control apparatus to follow the rapid changes in the error signal to which the controller is responding. The degradation of response to proportional, rate and reset functions may be equally disadvantageous.

One of the response limitations which may result in the loss of proportional control information, for example, is found in a control system having a velocity limited final control element such as a positioning motor whose velocity is limited to such a value that it cannot be made to follow very fast changes in the error signal to which the controller responds. Such a limitation may be a common factor in certain analogue control systems, however, it can also be a significant factor in a digital control system. In a digital control system the proportional response put out during one control cycle of the digital computer may be in excess of that to which the final control element can respond during that cycle; and, as a result, some of that proportional control may be lost.

Generally, the degradation of reset response results in incorrect or misstored control information. This may occur when there is a large control error such as during the startup of a process and when the final control element is at its limit so that it is unable to respond to the reset control signal. Under such conditions the excess reset control signals will generally be stored and later appear in the output of the process controller. As a result, the response upon a return of the error signal to zero may be an inappropriate response in that the reset information which was stored in the controller continues to effect a response by the final control element when in fact no such response is required or desired.

The degradation of response to either the proportional, reset or rate functions may be due to a loss of control information or to a misstorage of information as previously mentioned, and these causes may be associated with previously one of the responses depending upon the circuitry or the apparatus used to effect those responses.

Still another limitation which may cause a degradation of response is the limitations of the amplifier in the control apparatus circuitry. Amplifiers in control circuits are frequently saturated by large error signals, and such saturation causes a loss of control information. This limitation and the resulting degradation is avoided by the present invention as are the other causes of degraded response mentioned above.

For the purposes of this description, the loss of control information which may occur due to the inability of a final control element to respond as rapidly as desired or due to the saturation of an amplifier in a control circuit as well as the misstorage of information in an integrating circuit providing the reset function may all be considered to be the result of limitations in the response of a component of the control apparatus.

It is, therefore, an object of this invention to provide an improved method and means for process control.

It is a further object of this invention to provide a process control method and apparatus which will avoid the loss of control response proportional to the error between the variable being controlled and its set point.

A still further object of this invention is the provision of a process control method and apparatus which will avoid the incorrect storage of reset information.

It is a still further object of this invention to provide a process control method and apparatus which will prevent the degradation of control response due to the saturation of amplifiers in the control apparatus by preventing such saturation from occurring.

In accordance with this invention there is provided a method and means for preventing a degradation of the control of a manipulated variable due to a limitation in the response of one of the components of the control apparatus to changes in error signals exceeding a certain rate. The novel apparatus and method provides a control signal which is indicative of the change in the manipulated variable called for by the control apparatus and establishes a limit for said control signal. The error signal is modified to prevent the control signal from exceeding its limit to avoid degradation in the control. This is accomplished by changing the effective value of the error signal until the control signal has been reduced to a value which can be followed by the components of the control apparatus.

Figure 4:
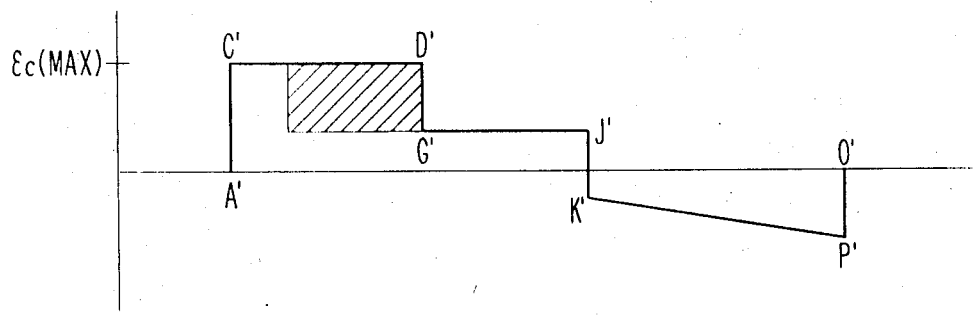
Figure 6:
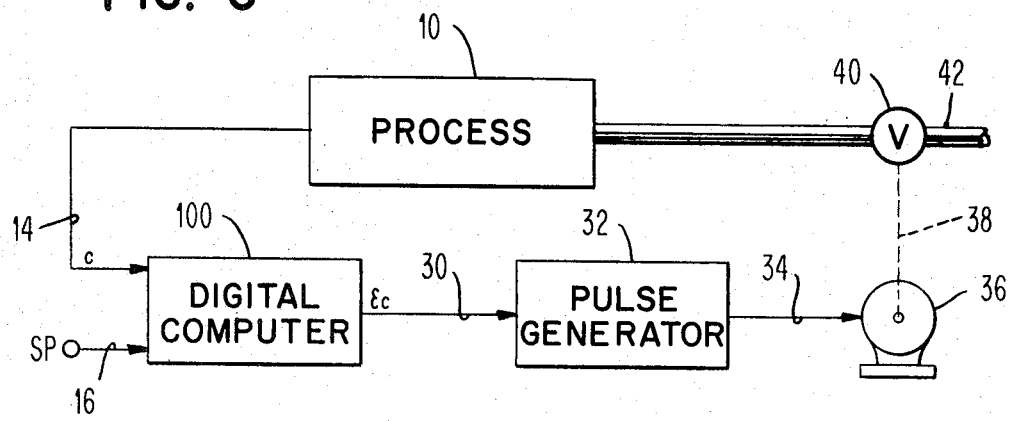
Figure 7:
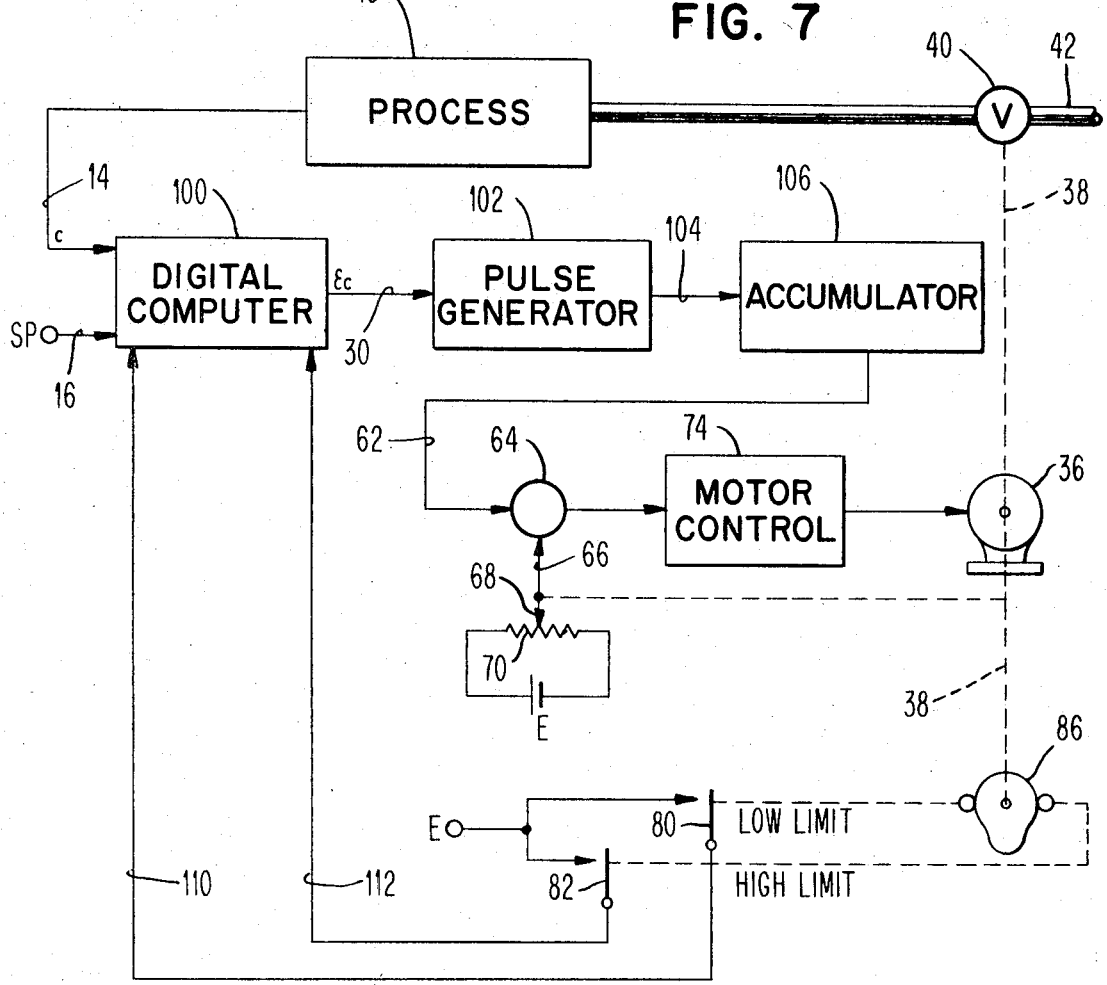

The invention may best be understood by reference to the following description taken in connection with the accompanying drawings in which like reference characters represent like elements and in which:

FIG. 1 is a diagram partially in block from showing one circuit for providing the novel process control in an analogue form, FIG. 2 shows one form which the controller of FIG. 1 may take, FIG. 3 is a graphical illustration of a control response which illustrates the need for the present invention, FIG. 4 is a graphical illustration showing the response of the control system utilizing the invention, FIG. 5 is a diagram showing a variation of the analogue control circuit of FIG. 1 which also incorporates the novel control system, FIG. 6 is a block diagram showing a digital control system equivalent to the analogue control system shown in FIG. 1, FIG. 7 is a block diagram showing a digital control system which is equivalent to the analogue control system of FIG. 5.

In FIG. 1 the control system is shown generally as a block diagram with the circuit details of the novel portion of the control circuit only being shown by the use of individual circuit elements in schematic form. In FIG. 1, the process 10 has a variable which is to be controlled; namely, the control variable "c" which may, for example, be the temperature or some other condition of the process and which is measured by any of the standard measuring elements so as to produce a signal on line 14 indicative of the value of the control variable. A signal is also produced on line 16 representative of the set point SP to which it is desired to control variable "c". The value of the control variable and the value of the set point are compared by summing junction 18 to produce an output from that summing junction $\epsilon$ representing the error signal. The error signal is shown as being provided on line 20 as an output from summing junction 18 and as an input to summing junction 22.

The inputs to summing junction 22 include not only the error signal on line 20 but also another signal which is present on line 24 and which will later be explained. The signal on line 24 is essentially subtracted from the signal on line 20 by the summing junction 22 to produce on line 26 a modified error signal $\epsilon'$ which forms an input signal to controller 28. The controller 28 in turn produces an output signal on line 30, $\epsilon_c$, which may be computed in accordance with the equation shown in FIG. 1; namely, $$\epsilon_o = I\epsilon' + P\frac{d\epsilon'}{dt}$$

where the term $P\, d\epsilon'/dt$ represents the required proportional response and the term $I\epsilon'$ represents the required reset response of the controller 28, which in this case is a two-mode controller. As has been previously mentioned, the invention may be applied to three-mode controllers; however, for convenience of illustration, the present description will be concerned only with the application of the invention to the two-mode controller.

The signal $\epsilon_c$ on line 30 provides an input to pulse generator 32 which in turn produces pulses on its output line 34 which may be of regularly frequency but having a duration which is proportional to the input signal $\epsilon_c$. Such pulses may be introduced as shown in FIG. 1 to a final control element such as a positioning motor 36 which may in turn be connected as by the shaft 38 to a control element such as valve 40. The modification of the position of valve 40 will be effective to control the manipulated variable of process 10 which may, for example, be the flow of fuel through a line 42 under the control of the valve 40. In an alternative arrangement the pulse generator 32 may be omitted and the signal $\epsilon_c$ can be utilized to directly control the positioning of a DC type motor.

The description of FIG. 1 to the present point concerns a well-known approach to process control if the introduction of the line 24 is omitted. This process controller provides a change in the position of valve 40 as effected by the final control element motor 36 in response to pulses generated by a pulse generator 32. As described, the pulses are generated in accordance with the final control signal $\epsilon_c$ which is derived from the controller 28 in response to the error signal. Thus, the valve 40 will be moved by motor 36 until the error signal $\epsilon$ is reduced to a value which is substantially zero.

Assuming, for example, that the motor 36 is velocity limited and is therefore unable to follow very rapid changes in the final control signal $\epsilon_c$ which may result from large errors or fast changing errors, it is desirable to prevent the loss of control information which would normally occur. To prevent such a loss of information there is introduced a circuit for producing a signal on line 24 which will serve to maintain the signal on line 26; namely, the signal $\epsilon'$ at a value which will not exceed that value which will cause the final control signal $\epsilon_c$ to be one which can be followed by the motor 36. To provide such a signal on line 24 there is utilized a parallel-connected set of Zener diodes 46 and 48 which are oppositely poled. These parallel-connected diodes are connected in a series circuit with potentiometer 31 and a high-gain amplifier 50. This series circuit is connected between line 30 and the summing junction 22 where the output of amplifier 50 is introduced on line 24.

The potentiometer 31 is preferably adjusted so that the breakdown potential of Zener diodes 46 and 48 corresponds with the maximum $\epsilon_c$ which can be tolerated on line 30 in view of the limitations of the velocity of motor 36. One of the diodes provides a limitation for the error control signal when it is positive in sign and the other provides the limitation for the error control signal when it is negative in sign. It will be evident that when the signal $\epsilon_c$ exceeds in potential the breakdown potential of one of the diodes 46 and 48 a signal will be produced at the input of high-gain amplifier 50 which will in turn produce an output signal on line 24 as an input to summing junction 22. This input to summing junction 22 on line 24 will serve to subtract from the error signal $\epsilon$ introduced on line 20 so as to produce on line 26 a modified error signal $\epsilon'$. The effect of the circuit, including diodes 46 and 48 and amplifier 50, will thus be to produce a modified error signal $\epsilon'$ which will not reach a value such that the final control signal $\epsilon_c$ exceeds its predetermined maximum value as established by the breakdown potential of diodes 46 and 48.

The limiting of the value of $\epsilon'$ will serve to prevent the saturation of any amplifiers in controller 28 or the loss of any control information provided by that controller.

The manner in which the novel circuit of FIG. 1 prevents the loss of control information will be more readily understood from the subsequent description of FIGS. 3 and 4.

It will be understood that the controller 28 may be any one of the many standard types of controllers. One which may be utilized is that shown in the circuit of FIG. 2.

In FIG. 2 the modified error signal $\epsilon'$ which is provided on the input 26 to controller 28 may be positive in sign as shown in FIG. 2. This modified error signal is introduced to a parallel circuit having in one branch a capacitor 54 for producing the proportional control signal by providing the derivative of the modified error signal. The other branch of the parallel circuit of controller 28 includes a variable resistor 56 which serves to provide the reset control signal which will be directly related to the magnitude of the product of the modified error signal $\epsilon'$ and the constant "$I$". The parallel circuit including capacitor 54 and variable resistor 56 is connected in series to an amplifier 58 by way of line 57. Amplifier 58 then produces as an output a final control signal on line 30, shown as $\epsilon_c$. This signal is shown in FIG. 2 as also having a plus sign indicating that amplifier 58 is preferably of the type which does not invert the sign of the signal.

In FIG. 3 the magnitudes of the proportional response term, the reset response term, and the sum of those two response terms, namely, the final control signal, are shown for a particular set of error signals $\epsilon$ plotted so that the value of signals is measured along the ordinate and the time at which the signals appear is measured along the abscissa. For the purpose of simplicity it is to be assumed that the error signal $\epsilon$ varies along the path AFHO.

During the period when the error signal follows the constant steep slope AF the proportional response which results from capacitor 54 of FIG. 2 is that represented by the envelope ABCEFGR. Thus, the proportional response is constant at the value represented by the line CE during the period when the error is changing from A to F if it is to be assumed that the response is not limited in any way.

During the same period, namely, while the error is changing from A to F at a constant rate, the reset signal will be that shown by the line AG and the area under the curve AGR represents the response to the reset function during the time interval AR Adding the response of the reset function to that of the proportional function; the sum, which is the final control signal $\epsilon_c$, then follows the envelope ABCDEFG.

If we assume that the velocity limiting of the control motor 36 of FIG. 1 prevents the response to any final control signal $\epsilon_c$ greater than that shown in FIG. 3 as $\epsilon_c$ (max), it will then be evident that the shaded portion BCDEFP is an area which represents the lost proportional response due to the inability of the elements of the control system to follow the control functions generated in response to the fast changing error AF.

During the period when the error is constant along the line FH, the proportional function and the reset function are such that the control system has no trouble in following the final control signal $\epsilon_c$ which will be along the line GJ representing a constant reset signal action and no proportional signal.

During the subsequent change of the error in its return to a zero value as shown in FIG. 3 line HO, the proportional response will be negative since the slope HO is negative and it will follow the line SKLPO while the reset response follows the line JO. Summing the reset and proportional responses the final control signal $\epsilon_c$ follows the line SKPO.

While the full proportional response is not taken advantage of during the change in the error value from A to F, nevertheless, all of the desired proportional response which is put in a positive sense as a result of capacitor 54 of FIG. 2 must be taken out in the negative sense during the return of the error signal to the zero value, and hence the area under the curve MNPO in FIG. 3 represents that part of the proportional response which is equal to the proportional response lost in the initial part of the control action when the error was changing from A to F; however, this proportional response, namely, the area under MNPO, is proportional response which is not beyond the capabilities of the control equipment and hence the motor 36 will respond to this proportional response and create as a net result a degradation in the control of the process.

The invention as disclosed in FIG. 1, for example, provides for the limiting of the error signal and hence the limiting of the control signal so that the components of the control system can follow the control response produced by the controller. As shown in FIG. 4, if the error varied in accordance with the curve AFHO in FIG. 3, the final control signal $\epsilon_c$ would vary in FIG. 4 along the curve A', C', D', G', J', K', P', and O'

By utilizing the circuit of FIG. 1 there is no lost proportional response instead all of the proportional response is utilized since the signal $\epsilon_c$ is never allowed to go over its maximum value and hence the motor is never asked to exceed its velocity limit. The shaded area in FIG. 4 represents the proportional response which was that portion lost in FIG. 3, and it is shown in FIG. 4 as being utilized Since it is utilized in FIG. 4, the proportional response in the negative direction which may have been adverse proportional response as discussed in connection with FIG. 3 is no longer adverse but is a useful proportional response which does not tend to degrade the control action.

In FIG. 5 there is shown another type of analogue control system to which the present invention is applicable. The control system of FIG. 5 differs from that of FIG. 1 in that there is utilized in FIG. 5 an integrating amplifier in place of a pulse generator and a control motor. This integrating amplifier 60 is connected to produce an output signal on line 62 to summing junction 64 indicative of the position desired for valve 40. The other input to summing junction 64 is by way of line 66 from tap 68 on slidewire 70. The slidewire 70 is supplied by potential source E so that the tap 68 provides on line 66 a potential depending upon its position as established by shaft 38 of motor 36. The difference between the signals on line 62 and line 66 represent the error in the position of valve 40. This error is supplied by way of line 72 to motor controller 74 which functions to provide an input to the motor 36 over line 76 which will cause the motor to rotate and position valve 40 in the proper direction until the signal on line 66 balances that appearing on line 62.

In addition to the above-mentioned differences, the circuit of FIG. 5 also includes low and high limit switches 80 and 82 which are placed in parallel with Zener diodes 48 and 46, respectively. The limit switches 80 and 82 are operated by cam 86 which is rotated by shaft 38 of motor 36 so that whenever the valve 40 reaches a low limit the switch 80 is closed and whenever the valve 40 reaches a high limit the switch 82 is closed. The closure of either of these switches reduces the threshold voltage of the appropriate sign, or in other words, the maximum voltage $\epsilon_c$ of that sign which can appear on line 30 to zero so that there is the maintained a zero signal on line 30 whenever the signal on line 30 tends to be of a polarity to cause the motor to move in the direction which has been limited. To provide for signals greater than zero on line 30 when $\epsilon_c$ is of a polarity such as to rotate the motor 36 in a direction to bring the valve 40 away from the limit, there are provided oppositely poled diodes 88 and 90 which are individually in series with the diodes 46 and 48, respectively.

It will be evident that the limit switches shown in FIG. 5 can be applied to the circuit of FIG. 1 by the addition of the necessary cam and limit switches as well as the diodes 88 and 90.

The circuit of FIG. 5 since it utilizes an integrator 60 would be subject to reset windup problems as might be created by the incorrect storage of reset control signals in integrating amplifier 60. For example, when the valve 40 is at one of its limits if there still exists an error $\epsilon$, the signal $\epsilon_c$ will continue to contain a reset signal which will cause the output of the integrator on line 62 to continue the change although the motor cannot follow that changing signal because of the fact that the valve is already at the limit. Such continual integration by amplifier 60 would not occur, however, when the novel circuit including diodes 46, 48, 88, and 90 is utilized, for when those diodes are utilized along with the limit switches shown, the signal on line 30 would be maintained at zero whenever the motor had driven the valve 40 to a limit and therefore the continual integration by amplifier 60 would not occur and the false storage of control information would not result; therefore, the control action would not be degraded in any way by the limitation of the response of motor 36 due to the limiting condition of valve 40.

FIG. 5 also illustrates a system in which it would be possible without the use of the novel circuit to experience a degradation of control function due to the saturation of amplifier 58 or 60. This, however, will be prevented by the establishing of limits by means of the novel circuit including Zener diodes 46 and 48 along with potentiometer 31 and the limit switches 80 and 82 which, taken together, will limit the value of the potential on line 30 so that amplifiers 58 and 60 would not be saturated and thus there would be no loss in control information contained in the signal $\epsilon_c$.

The analogue control systems of FIGS. 1 and 5 provide a control which may also be accomplished by the use of a digital computer for computing the value of the final control signal $\epsilon_c$ from the measured value of the control variable "c" and the set point SP. In FIG. 6 there is shown a control system utilizing a digital computer which is the equivalent of the analogue control system of FIG. 1. The inputs to the digital computer are the measurement of the control variable "c" and the set point SP while the output is the computed value for the final control signal $\epsilon_c$. Other than the introduction of the digital computer 100 in FIG. 6 the elements of FIG. 6 are like elements of FIG. 1. In FIG. 6 the computation of the final control signal and the effecting of a limitation of that final control signal to a value which can be utilized during any one control cycle of computer 100 by the velocity limited motor 36 is carried out in the digital computer 100. One form of program for carrying out the production of the final control signal and limiting its value may be that expressed by the following steps:

1. Subtract set points SP from the value of control variable c sampled at the present time (n) to obtain the error $\epsilon(n)$, hence: $\epsilon(n) = SP - c(n)$ 2. Calculate reset term $\epsilon_I$.

$$\epsilon_I = I\epsilon(n)$$

where $I$ = reset rate.

3. Calculate proportional term $\epsilon_p$.

$$\epsilon_p = P[\epsilon(n) - \epsilon(n-)]$$

where P = proportional constant $\epsilon(n-1)$ = effective error at last sampling period.

4. Calculate change in manipulated variable required at the present (n) sampling period.

$$\epsilon_c = \epsilon_I + \epsilon_p$$

5. Compare absolute value of $\epsilon_c$ with the maximum value $\epsilon_c$ (max) which can be followed by the final control elements;

if $|\epsilon_c| \leq \epsilon_c$ (max) go to step 10

6. Calculate effective $\epsilon'(n)$ corresponding to $\epsilon_c$ (max).

$$\epsilon'(n) = \frac{\epsilon_c(\max) + P\epsilon(n-1)}{I+P}$$

[With $\epsilon_c$ (max) having the sign of $\epsilon_c$]

7. Store $\epsilon'(n)$ calculated as $\epsilon(n-1)$.
8. Output $\epsilon_c$ (max) and sign of $\epsilon_c$ to pulse generator.
9. Exit.
10. Store $\epsilon(n)$ as $\epsilon(n-1)$.
11. Output $\epsilon_c$ to pulse generator.
12. Exit.

In FIG. 7 there is shown a system which utilizes the digital computer 100 which may be a computer similar to that shown in FIG. 6 to carry out the computation of the final control signal $\epsilon_c$ and the limiting of its value to one which will not cause a degradation of the control of the process. In FIG. 7 the integrating amplifier 60 of FIG. 5 is replaced by pulse generator 102 which receives signals from line 30 representing the final control signal $\epsilon_c$ and then transmits them over line 104 to the accumulator 106 which is in turn connected to line 62. Thus, the pulse generator 102 and accumulator 106 serve to provide the same effect as the integrating amplifier 60 of FIG. 5 in that they produce on line 62 a signal representative of the desired position for valve 40.

FIG. 7 also shows the use of a cam 86 to operate the low and high limit switches 80 and 82, respectively. The closing of the low or high limit switch is effective to connect a potential E to the digital computer 100 over either line 110 or 112 depending upon whether a low or high limit has been reached for valve 40. The potential appearing on line 110 or 112 will be converted in the digital computer to a digital signal indicating that a low or high limit has been reached. The program set forth above as an example of the program which can be used in the digital computer of FIG. 6 for computing and producing a signal $\epsilon_c$ can also be used in the digital computer of FIG. 7 for the same purpose. In FIG. 7, however, the introduction of the limits requires additional steps in the program. These additional steps are listed below and are numbered to represent the position they would have in the program set forth for FIG. 6. Thus, to arrive at the program required for the digital computer 100 of FIG. 7 it is only necessary to add the following steps to the program set forth for the digital computer 100 of FIG. 6:

4a. Determine if high limit switch is closed.
   If it is, go to step 13, otherwise continue to step 4b.
4b. Determine if low limit switch is closed.
   If it is, go to step 15, otherwise continue to step 5.
13. Determine if $\epsilon_c > 0$.
   If it is not, go to step 4b, otherwise continue to 14.
14. Exit.
15. Determine if $\epsilon_c < 0$.
   If it is not, go to step 5, otherwise go to step 14.

It will be evident to those skilled in the art that the function of the pulse generator 102 and the accumulator 106 of FIG. 7 could be carried out in computer 100. With such an arrangement the output of computer 100 would be a signal representing the position desired for valve 40. This signal would appear on line 62 as shown in FIG. 7.

I claim:

1. A process control apparatus comprising:
   means for measuring a controlled variable of the process and providing a first signal indicative of the measured value,
   means for providing a second signal indicative of the set point for said controlled variable,
   means for comparing said first and second signals to produce an error signal in accordance with the difference therebetween,
   means for producing a control signal from said error signal so that said control signal has a proportional and reset component,
   means operable when said control signal exceeds a predetermined maximum value to modify said error signal to which said control signal producing means responds so that said control signal does not exceed said maximum value, and
   means responsive to said control signal for controlling a manipulated variable of said process so as to tend to bring said measured value of the controlled variable to equality with said set point, said last-named means including an integrating amplifier and a control means for changing the manipulated variable until its value corresponds with the output of said integrating amplifier.

2. A process control apparatus comprising:
   means for measuring a controlled variable of the process and providing a first signal indicative of the measured value,
   means for providing a second signal indicative of the said set point for said controlled variable,
   means for comparing said first and second signal to produce an error signal in accordance with the difference therebetween,
   means for producing a control signal from said error signal so that said control signal has a proportional and reset component,
   means operable when said control signal exceeds a predetermined maximum value to modify said error signal to which said control signal producing means responds so that said control signal does not exceed said maximum value, said last-named means including parallel connected oppositely poled Zener diodes for establishing the maximum values for said control signal and a high gain amplifier for producing a signal to modify said error signal until the control signal is maintained below said maximum value, and
   means responsive to said control signal for controlling a manipulated variable of said process so as to tend to bring said measured value of the controlled variable to equality with said set point, said last-named means being effective to operate limit switches which selectively short an appropriate one of said Zener diodes when said manipulated variable has been altered to a limit condition, whereby the control signals are reduced to zero for error signals calling for a change in the manipulated variable in the limited direction.

3. In a process control system, the method for controlling a manipulated variable so as to tend to bring the measured control variable to its set point without a degradation of the control of said manipulated variable due to inability of the system to produce changes in the manipulated variable as called for by the control system, comprising the steps of:
   establishing a signal representing said measured control variable;
   establishing a set point signal representing the desired value of said control;
   comparing said set point signal and said signal representing said measured control variable to produce an error signal;
   producing a control signal in accordance with said error signal, said control signal including a proportional and reset component;
   producing in accordance with said control signal an effective error signal of magnitude such that a corresponding control signal will not exceed the predetermined value which will cause the control response to be degraded, and
   modifying said manipulated variable in accordance with said control signal by the steps of:
   a. producing at regular intervals pulses of duration proportional to the magnitude of said control signal;
   b. accumulating said pulses to produce a signal indicative of the desired state of the control element which controls said manipulated variable;
   c. producing a signal indicative of the actual state of said final control element, and
   d. comparing said signal indicative of the desired state with said signal indicative of the actual state and producing in accordance with said difference a signal for controlling the said final control element until said difference is reduced to zero.

4. In a process control apparatus responsive to an error signal for modifying the manipulated variable of the process so as to tend to bring the associated controlled variable to its set point, means for preventing a degradation of the control due to a limitation in the response of one of the components of said apparatus to changing error signals comprising:
   control means for producing a control signal representative of the change in the manipulated variable called for by said control apparatus in response to said error signal, said control means being operative to calculate a proportional response part of the control signal in accordance with the time derivative of the effective error signal;
   limit means for establishing a maximum value for said control signal which will avoid said degradation; and correcting means operable when said control signal exceeds said maximum value to change the effective error signal to its said control responds by an amount sufficient to bring said control signal to a value not exceeding said maximum.

UNITED STATES PATENT OFFICE
CERTIFICATE OF CORRECTION

Patent No. 3,566,241                    Dated February 23, 1971

Inventor(s) Charles W. Ross

It is certified that error appears in the above-identified patent and that said Letters Patent are hereby corrected as shown below:

Column 1, line 52,   "previously" should read --any--;

Column 2, line 26,   "from" should read --form--;

Column 4, line 37,   Insert a period after "AR";

Column 5, line  7,   Insert a comma after "response", first occurence;

Column 5, line 12,   Insert a period after "utilized";

Column 5, line 47,   "the" should read --then--;

Column 6, line 44,   "$\varepsilon_p = P[\varepsilon(n) - \varepsilon(n-)]$" should read --$\varepsilon_p = P[\varepsilon(n) - \varepsilon(n-1)]$--;

CLAIM 3, Column 8, line 38,    After "control" insert --variable--.

Signed and sealed this 25th day of April 1972.

(SEAL)
Attest:

EDWARD M. FLETCHER, JR.
Attesting Officer

ROBERT GOTTSCHALK
Commissioner of Patents